United States Patent
Bhattacharjee et al.

(10) Patent No.: US 11,880,605 B2
(45) Date of Patent: Jan. 23, 2024

(54) MANAGING EPHEMERAL STORAGE OF A VIRTUAL MACHINE TO PROVIDE VICTIM CACHES FOR USE BY VIRTUAL STORAGE APPLIANCES IN A CLOUD ENVIRONMENT

(71) Applicant: NetApp, Inc., San Jose, CA (US)

(72) Inventors: Mrinal K. Bhattacharjee, Bangalore (IN); Shivali Gupta, Bangalore (IN); Neha Saini, Uttar Pradesh (IN)

(73) Assignee: NetApp, Inc., San Jose, CA (US)

( * ) Notice: Subject to any disclaimer, the term of this patent is extended or adjusted under 35 U.S.C. 154(b) by 11 days.

(21) Appl. No.: 17/671,775

(22) Filed: Feb. 15, 2022

(65) Prior Publication Data

US 2023/0259311 A1 Aug. 17, 2023

(51) Int. Cl.
*G06F 3/06* (2006.01)

(52) U.S. Cl.
CPC ............ *G06F 3/0664* (2013.01); *G06F 3/064* (2013.01); *G06F 3/067* (2013.01); *G06F 3/0613* (2013.01); *G06F 3/0631* (2013.01)

(58) Field of Classification Search
CPC ...... G05B 13/00–048; G05B 15/00–02; G05B 17/00–02; G06F 1/00–3296; G06F 3/00; G06F 3/06–0689; G06F 5/00–16; G06F 8/00–78; G06F 9/00–548; G06F 11/00–3696; G06F 12/00–16; G06F 13/00–4295; G06F 15/00–825; G06F 16/00–986; G06F 18/00–41; G06F 17/00–40; G06F 21/00–88; G06F 2009/3883; G06F 2009/45562–45595;

(Continued)

(56) References Cited

U.S. PATENT DOCUMENTS

| | | | |
|---|---|---|---|
| 11,093,139 B1 * | 8/2021 | Karr | G06F 3/0685 |
| 11,327,676 B1 * | 5/2022 | Fernandez | G06F 12/0862 |

(Continued)

OTHER PUBLICATIONS

ONTAP Select on KVM Product Architecture and Best Practices; Veena Kannan; Mar. 2019; retrieved from https://www.netapp.com/pdf.html?item=/media/13134-tr4613pdf.pdf on Apr. 20, 2023 (Year: 2019).*

(Continued)

*Primary Examiner* — Daniel C. Chappell
(74) *Attorney, Agent, or Firm* — Jaffery Watson Mendonsa & Hamilton LLP (57) ABSTRACT

Systems and methods are described for managing ephemeral storage of a virtual machine (VM) to provide victim caches for virtual storage appliances running on the VM. According to one embodiment, a central service may run within the VM and be responsible for managing allocation and reclamation of ephemeral storage space of the VM to/from the virtual storage appliances. Responsive to startup of a new virtual storage appliance on the VM, the new virtual storage appliance may request space from the central service to inform creation of its victim cache. In connection with servicing the request, the central service may take into consideration various factors including one or more of the total aggregate size of multiple local ephemeral drives associated with the VM, remaining available ephemeral storage space, the number of active virtual storage appliances, and the SLO of the virtual storage appliance seeking to establish its victim cache.

20 Claims, 6 Drawing Sheets

(58) Field of Classification Search
CPC ...... G06F 2015/761–768; G06F 2201/00–885;
G06F 2206/00–20; G06F 2209/00–549;
G06F 2211/00–902; G06F 2212/00–7211;
G06F 2213/00–4004; G06F 2216/00–17;
G06F 2221/00–2153; G06N 3/00–126;
G06N 5/00–048; G06N 7/00–08; G06N
10/00; G06N 20/00–20; G06N
99/00–007; G06T 1/00–60; G06V
30/00–43; G11B 20/00–24; G11B
33/00–1493; G11C 11/00–5692; G11C
13/00–06; G11C 14/00–009; G11C
15/00–06; G11C 16/00–3495; G11C
17/00–18; G11C 2207/00–229; G11C
2216/00–30; H01L 25/00–50; H01L
2225/00–1094; H03M 7/00–707; H04L
9/00–38; H04L 12/00–66; H04L
41/00–5096; H04L 49/00–9094; H04L
61/00–59; H04L 67/00–75
See application file for complete search history.

(56) References Cited

U.S. PATENT DOCUMENTS

| | | | | |
|---|---|---|---|---|
| 11,442,669 | B1* | 9/2022 | Frandzel | G06F 3/0605 |
| 2008/0235474 | A1* | 9/2008 | Hwang | G06F 12/0842 |
| | | | | 711/E12.091 |
| 2017/0344575 | A1 | 11/2017 | Naylor et al. | |
| 2021/0019067 | A1* | 1/2021 | Miller | G06F 3/0641 |
| 2021/0019070 | A1* | 1/2021 | Karr | G06F 3/0664 |
| 2021/0019093 | A1* | 1/2021 | Karr | G06F 3/0647 |
| 2021/0019237 | A1* | 1/2021 | Karr | G06F 3/0647 |
| 2022/0019367 | A1* | 1/2022 | Freilich | G06F 3/067 |
| 2022/0019385 | A1* | 1/2022 | Karr | G06F 3/0607 |
| 2022/0035714 | A1* | 2/2022 | Schultz | G06F 11/1438 |
| 2022/0083245 | A1* | 3/2022 | Kant | G06F 3/0632 |
| 2022/0222104 | A1* | 7/2022 | Dornemann | G06F 11/1464 |

OTHER PUBLICATIONS

It's a Small, Small Data World: How NetApp FlexCache Makes It Smaller; Chris Hurley; Feb. 18, 2019; retrieved from https://www.netapp.com/blog/how-netapp-flexcache-makes-the-world-smaller/ on Apr. 20, 2023 (Year: 2019).*
Definition of "ephemeral"; Merriam-Webster Online Dictionary; Jul. 9, 2020; retrieved from http://www.merriam-webster.com/dictionary/ephemeral on Apr. 21, 2023 (Year: 2020).*
J. Vallone, R. Birke, L. Y. Chen and B. Falsafi, "n," 2015 IEEE 23rd International Symposium on Quality of Service (IWQoS), Portland, OR, USA, 2015, pp. 237-242, doi: 10.1109/IWQoS.2015.7404740. (Year: 2015).*
NetApp, "Storage ONTAP Select," NetApp, Dec. 2, 2021, 34 pages.
Ephemeral OS Disks for Azure VMs, Microsoft Learn, Retrieved from Internet URL : https://learn.microsoft.com/en-us/azure/virtual-machines/ephemeral-os-disks, Mar. 9, 2023, 5 pages.
Ephemeral Storage Mirror on an EBS, N2WS, Retrieved from Internet URL : Volume https://n2ws.com/blog/how-to-guides/ephemeral-storage-on-ebs-volume#:~: text=Ephemeral, May 26, 8 Pages.
Etkins J., "IBM Cloud Tip: A Basic Understanding of Ephemeral," IBM, Feb. 9, 2011, 5 Pages.
File (NAS) vs. Block (SAN) vs. Object Cloud Storage, Retrieved from Internet URL : https://www.zachgollwitzer.com/posts/cloud-storage-types, Mar. 28, 2019, 11 Pages.
Patterson, J., "What Are These Ephemeral Drives on My VM?," Retrieved from Internet URL : https://vroomperformance.com/what-are-these-ephemeral-drives-on-my-vm/, accessed on Feb. 6, 2019, 3 pages.
Schindler J., "Re-designing Enterprise Storage Systems for FLASH Memory," Advanced Technology Group, 2009, 27 Pages.
Virtual Private Cloud, Product Guide, IBM Cloud Docs, Retrieved from Internet URL : https://cloud.ibm.com/docs/vpc?topic=vpc-instance-storage, Last updated Apr. 25, 2023, 8 pages.
What Data Is Stored in Ephemeral Storage of Amazon EC2 Instance, Saturn Cloud, Retrieved from Internet URL : https://saturncloud.io/blog/what-data-is-stored-in-ephemeral-storage-of-amazon-ec2-instance/#:~:text=Introduction, Jun. 19, 2023, 2 Pages.

* cited by examiner

MANAGING EPHEMERAL STORAGE OF A VIRTUAL MACHINE TO PROVIDE VICTIM CACHES FOR USE BY VIRTUAL STORAGE APPLIANCES IN A CLOUD ENVIRONMENT

BACKGROUND

Field

Various embodiments of the present disclosure generally relate to data storage systems and networks. In particular, some embodiments relate to an approach for managing and sharing ephemeral storage in cloud storage environments for use as a victim cache for respective virtual storage appliances.

Description of the Related Art

In storage networks, storage server computing devices may share a pool of data storage devices for persistent data storage. In a cloud environment, storage server computing devices host virtual storage appliances (e.g., implemented as containers or pods running on a virtual machine (VM)) that carry out functions relating to management of the storage network and the data stored on the data storage devices.

Storage server computing devices may include a buffer cache that is an in-memory cache used by virtual storage appliances to cache data that is read from data storage devices. In this manner, in the event a subsequent access relates to data residing within the buffer cache, the data can be served from local, high performance, low latency storage, thereby improving overall performance of the virtual storage appliance.

Cloud storage providers generally monetize the hosting of data by monitoring the amount of data exchanged between the storage server computing devices and the data storage devices of a persistent storage pool. Since servicing the subsequent access of data stored in a buffer cache does not require communication with a data storage device, costs may be reduced by using a hierarchy of caches including the buffer cache and a victim cache. While caching provides performance and cost advantages in storage networks, buffer caches are limited in size and victim caches that uses normal cloud storage resources count against limited disk input/output operations per second (IOPS) available to the VM machine at issue.

SUMMARY

Systems and methods are described for managing ephemeral storage of a virtual machine to provide victim caches for one or more virtual storage appliances running on the virtual machine. According to one embodiment, one or more local ephemeral storage devices associated with a virtual machine (VM) in a cloud environment are discovered by a central service. Thereafter, the sharing of ephemeral storage space of the one or more local ephemeral storage devices among multiple virtual storage appliances that are created on the VM is facilitated by the central service by, responsive to receipt of a request by a new virtual storage appliance of the multiple virtual storage appliances, allocating an amount of space within the ephemeral storage space for use by the new virtual storage appliance as a victim cache of the new virtual storage appliance and returning information regarding the amount of space to the new virtual storage appliance.

Other features of embodiments of the present disclosure will be apparent from accompanying drawings and detailed description that follows.

BRIEF DESCRIPTION OF THE DRAWINGS

In the Figures, similar components and/or features may have the same reference label. Further, various components of the same type may be distinguished by following the reference label with a second label that distinguishes among the similar components. If only the first reference label is used in the specification, the description is applicable to any one of the similar components having the same first reference label irrespective of the second reference label.

DETAILED DESCRIPTION

Systems and methods are described for managing ephemeral storage of a virtual machine to provide victim caches for virtual storage appliances running on the virtual machine. In a cloud environment, IOPS limits for an ephemeral drive, which exists only as long as the compute instance (e.g., VM) with which it is associated, are typically significantly higher than IOPS limits for persistent storage. As such, one potential approach to avoid usage of an external victim cache impacting disk IOPS limits may involve a compute instance that hosts a virtual storage appliance taking control of an ephemeral drive associated with the storage server computing device and allowing the virtual storage appliance to implement the external victim cache therein. This basic concept of using a local ephemeral storage device for a victim cache would likely be sufficient for lower end configurations or VM applications but is not readily extensible to more complicated cloud instances that may include multiple VMs on a given storage server computing device potentially having multiple local ephemeral storage devices and in which multiple virtual storage appliances may be running within a given VM that may each have a need for space for their respective victim caches. In such more complex cloud instances, a more thoughtful approach should be taken to appropriately share (e.g., allocate and reclaim) ephemeral storage for use by victim caches of multiple competing virtual storage appliances as they follow a defined lifecycle and are dynamically created and terminated.

In various embodiments described herein, a central service may run within a VM and be responsible for managing assignment of ephemeral storage space allocated to the VM to multiple associated virtual storage systems. For example, responsive to startup of a virtual storage appliance, it may request space from the central service to inform creation of its victim cache. As described further below, in connection with acting on the request, the central service may take into consideration various factors including one or more of the total aggregate size of multiple local ephemeral drives of the storage server computing device, remaining available ephemeral storage space, the number of active virtual storage appliances, and the service level objective (SLO) (e.g., expressed in term of a number of IOPS per unit (e.g., terabyte (TB)) of persistent storage) of the virtual storage appliance seeking to establish its victim cache.

The methodologies described herein provide a number of advantages including methods, non-transitory computer readable media, and devices that facilitate and improve the management of ephemeral storage devices for use as victim caches for virtual storage appliances implemented in complex cloud instances of a cloud environment, in which multiple VMs may be deployed on a given storage server computing device potentially having multiple local ephemeral storage devices and in which multiple virtual storage appliances may be running within a given VM.

In the following description, numerous specific details are set forth in order to provide a thorough understanding of embodiments of the present disclosure. It will be apparent, however, to one skilled in the art that embodiments of the present disclosure may be practiced without some of these specific details. In other instances, well-known structures and devices are shown in block diagram form.

Terminology

Brief definitions of terms used throughout this application are given below.

A "computer" or "computer system" may be one or more physical computers, virtual computers, or computing devices. As an example, a computer may be one or more server computers, cloud-based computers, cloud-based cluster of computers, virtual machine instances or virtual machine computing elements such as virtual processors, storage and memory, data centers, storage devices, desktop computers, laptop computers, mobile devices, or any other special-purpose computing devices. Any reference to "a computer" or "a computer system" herein may mean one or more computers, unless expressly stated otherwise.

The terms "connected" or "coupled" and related terms are used in an operational sense and are not necessarily limited to a direct connection or coupling. Thus, for example, two devices may be coupled directly, or via one or more intermediary media or devices. As another example, devices may be coupled in such a way that information can be passed there between, while not sharing any physical connection with one another. Based on the disclosure provided herein, one of ordinary skill in the art will appreciate a variety of ways in which connection or coupling exists in accordance with the aforementioned definition.

If the specification states a component or feature "may", "can", "could", or "might" be included or have a characteristic, that particular component or feature is not required to be included or have the characteristic.

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise.

The phrases "in an embodiment," "according to one embodiment," and the like generally mean the particular feature, structure, or characteristic following the phrase is included in at least one embodiment of the present disclosure and may be included in more than one embodiment of the present disclosure. Importantly, such phrases do not necessarily refer to the same embodiment.

As used herein a "cloud" or "cloud environment" broadly and generally refers to a platform through which cloud computing may be delivered via a public network (e.g., the Internet) and/or a private network. The National Institute of Standards and Technology (NIST) defines cloud computing as "a model for enabling ubiquitous, convenient, on-demand network access to a shared pool of configurable computing resources (e.g., networks, servers, storage, applications, and services) that can be rapidly provisioned and released with minimal management effort or service provider interaction." P. Mell, T. Grance, The NIST Definition of Cloud Computing, National Institute of Standards and Technology, USA, 2011. The infrastructure of a cloud may cloud may be deployed in accordance with various deployment models, including private cloud, community cloud, public cloud, and hybrid cloud. In the private cloud deployment model, the cloud infrastructure is provisioned for exclusive use by a single organization comprising multiple consumers (e.g., business units), may be owned, managed, and operated by the organization, a third party, or some combination of them, and may exist on or off premises. In the community cloud deployment model, the cloud infrastructure is provisioned for exclusive use by a specific community of consumers from organizations that have shared concerns (e.g., mission, security requirements, policy, and compliance considerations), may be owned, managed, and operated by one or more of the organizations in the community, a third party, or some combination of them, and may exist on or off premises. In the public cloud deployment model, the cloud infrastructure is provisioned for open use by the general public, may be owned, managed, and operated by a cloud provider (e.g., a business, academic, or government organization, or some combination of them), and exists on the premises of the cloud provider. The cloud service provider may offer a cloud-based platform, infrastructure, application, or storage services as-a-service, in accordance with a number of service models, including Software-as-a-Service (SaaS), Platform-as-a-Service (PaaS), and/or Infrastructure-as-a-Service (IaaS). In the hybrid cloud deployment model, the cloud infrastructure is a composition of two or more distinct cloud infrastructures (private, community, or public) that remain unique entities, but are bound together by standardized or proprietary technology that enables data and application portability (e.g., cloud bursting for load balancing between clouds).

Example Network Environment

Figure 1:
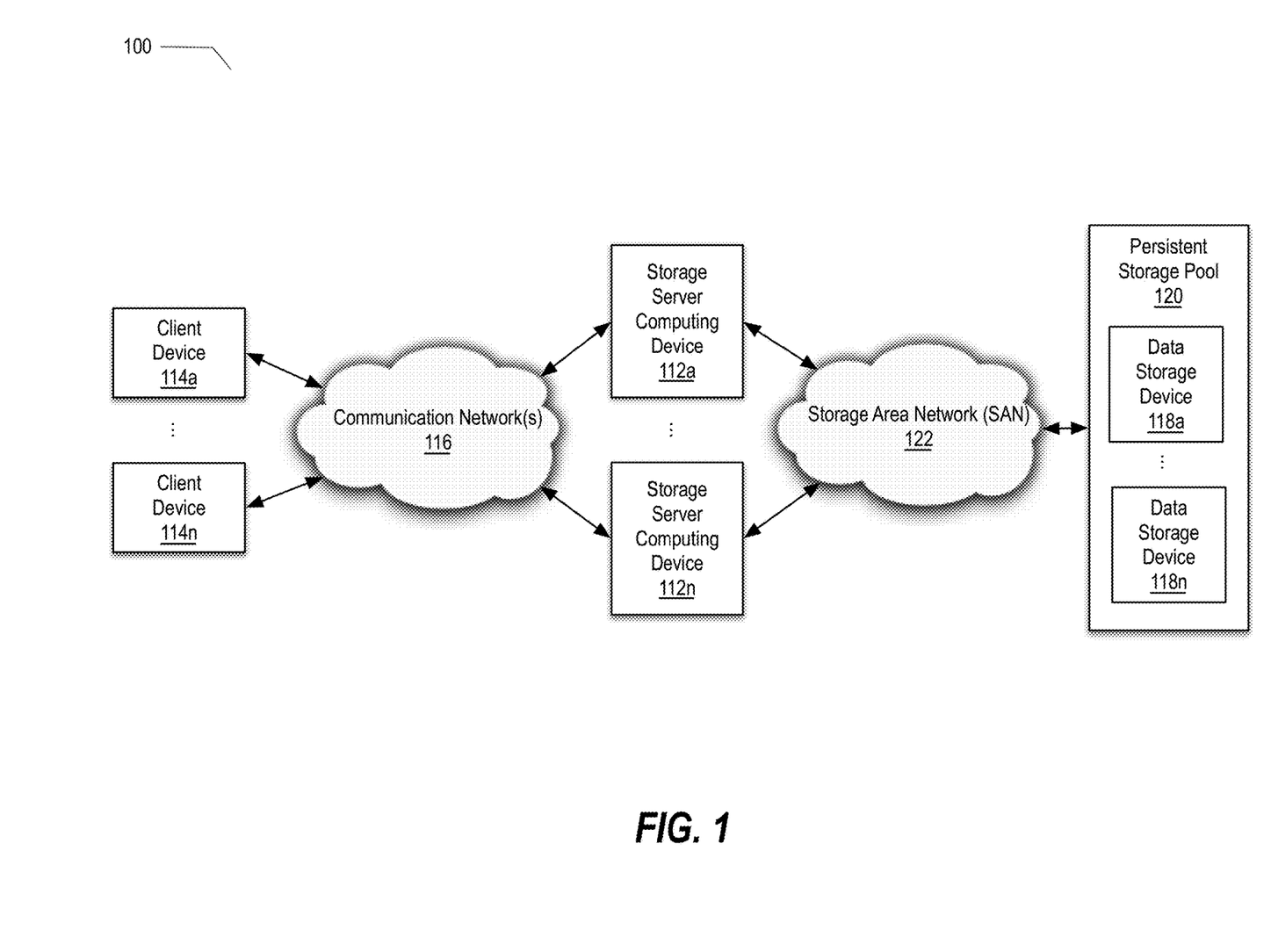
FIG. 1 is a block diagram of a network environment with exemplary storage server computing devices in accordance with an embodiment of the present disclosure.

FIG. 1 is a block diagram of a network environment 100 with exemplary storage server computing devices in accordance with an embodiment of the present disclosure. In various examples described herein the network environment 100 represents a cloud storage network environment including client devices 114a-n, communication network(s) 116, storage server computing devices 112a-n, a storage area network (SAN) 122, and a persistent storage pool 120 including data storage devices 118a-n.

Each of the client devices 114a-n may include a processor, a memory, a communication interface, and optionally an input device, and a display device, which are coupled together by a bus or other link, although each of the client devices 114*a-n* can have other types and numbers of components or other elements and other numbers and types of network devices could be used. The client devices 114*a-n* may run interface applications that provide an interface to make requests for and send content and/or data to storage server computing devices 112*a-b* via the communication network(s) 116, for example. Each of the client devices 114*a-n* may be a conventional personal computer, a tablet computing device, a smart phone, a virtual machine running in a cloud, an application server hosting applications that utilize backend storage, or other processing and/or computing device, for example.

By way of example only, the communication network(s) 116 and/or SAN 122 can use TCP/IP over Ethernet and industry-standard protocols, including NFS, CIFS, SOAP, XML, LDAP, and SNMP, although other types and numbers of communication networks, can be used. The communication network(s) 116 may employ any suitable interface mechanisms and network communication technologies including, for example, teletraffic in any suitable form (e.g., voice, modem, and the like), Public Switched Telephone Network (PSTNs), Ethernet-based Packet Data Networks (PDNs), combinations thereof, and the like. The communication network(s) 116 may also comprise any local area network and/or wide area network (e.g., Internet), although any other type of traffic network topologies may be used. The SAN 122 can also utilize a conventional high-performance, Fibre Channel serial link topology, SAS, SCSI, or SATA, in other examples.

A non-limiting example of the storage server computing devices 112*a-n* is described further below with reference to FIG. 2. The storage server computing devices 112*a-n* in this example are coupled to client devices 114*a-n* via communication network(s) 116 and data storage devices 118*a-n* in a persistent storage pool 120 via another communication network referred to in FIG. 1 as a storage area network (SAN) 122.

The data storage devices 118*a-n* can be hard disk drives (e.g., solid-state drives (SSDs)), optical disk-based storage, or any other type of stable, non-volatile storage suitable for storing files or objects in storage volumes for short or long term retention, for example. The data storage devices 118*a-n* optionally host one or more volumes based on a Redundant Array of Inexpensive Disks (RAID) architecture or other topology facilitating data persistency, although other types and numbers of volumes in other topologies can also be used.

Depending on the particular implementation various portions (e.g., storage server computing devices 112*a-n*, storage area network (SAN) 122, and data storage devices 118*a-n*) of the network environment 100 may be implemented within a cloud environment, such as a private cloud, a public cloud (e.g., Amazon Web Services (AWS), Microsoft Azure, or Google Cloud Platform (GCP)), a community cloud, or a hybrid cloud.

While for sake of brevity, the network environment 100 is described at a high-level, it is to be appreciated the network environment 100 can include other numbers and types of systems, devices, components, and/or elements in other configurations. Additionally, as those skilled in the art will appreciate, the network environment 100 may include other network devices, such as one or more routers and/or switches, for example. This technology provides a number of advantages including methods, non-transitory computer readable media, and devices that facilitated utilization of an ephemeral storage device as a victim cache to improve virtual storage appliance performance in a cloud environment.

Although examples of the storage server computing devices 112*a-n*, client devices 114*a-n* and data storage devices 118*a-n* are described and illustrated herein, it is to be understood that the devices and systems of the examples described herein are for exemplary purposes, as many variations of the specific hardware and software used to implement the examples are possible, as will be appreciated by those skilled in the relevant art(s). In addition, two or more computing systems or devices can be substituted for any one of the systems in any embodiment of the examples.

Example Storage Server Computing Device

Figure 2:
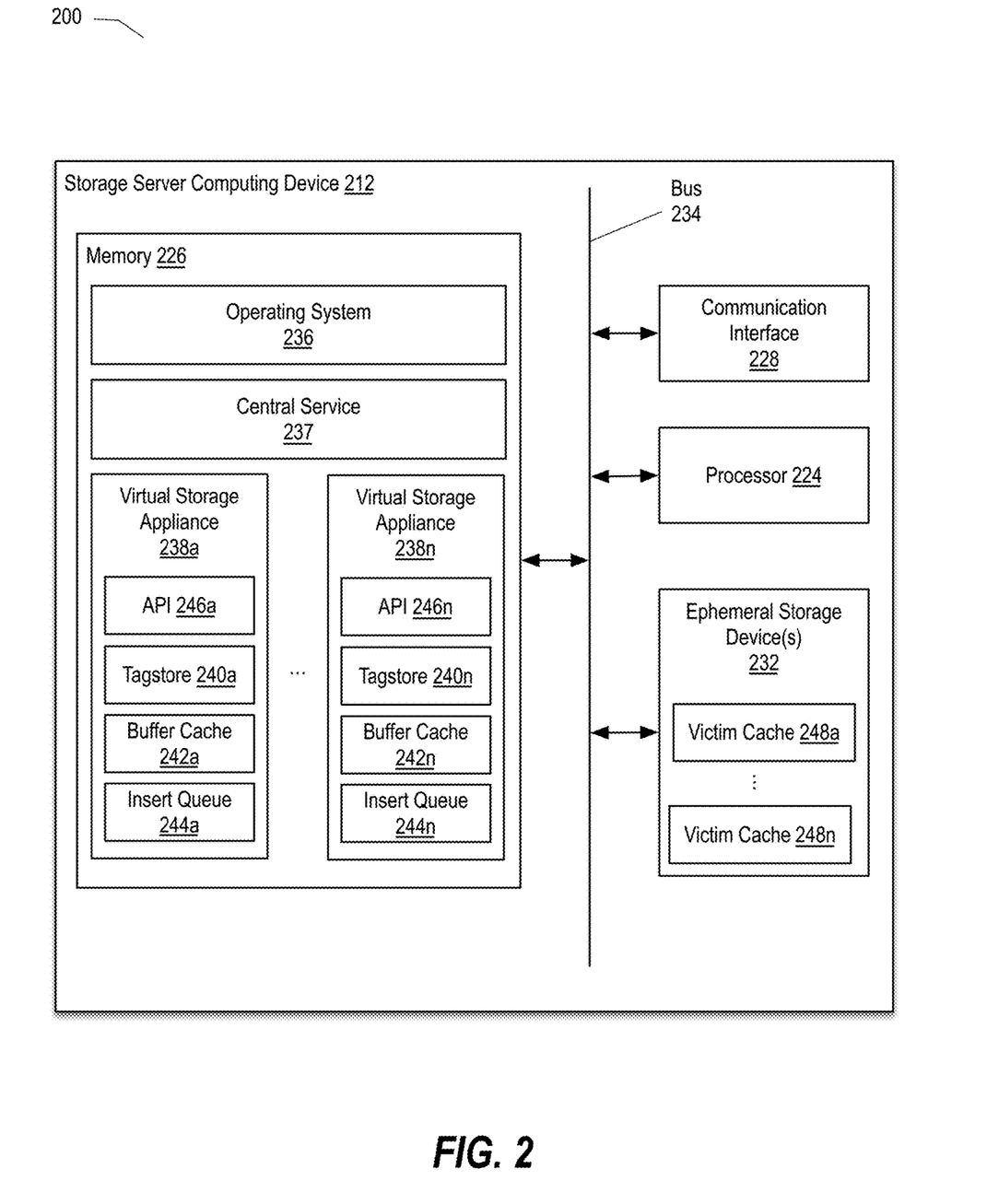
FIG. 2 is a block diagram of a storage server computing devices in accordance with an embodiment of the present disclosure.

FIG. 2 is a block diagram of a storage server computing device 212 in accordance with an embodiment of the present disclosure. The storage server computing device 212 represents a non-limiting example of storage server computing devices 112*a-n* of FIG. 1. In one embodiment, the storage server computing device 212 generally provides file services relating to the organization of information on data storage devices (e.g., data storage devices 118*a-n* of FIG. 1) on behalf of clients (e.g., client devices 114*a-n* of FIG. 1). In this example, the storage server computing device 212 includes processing resource(s) (e.g., processor(s) 224), a memory 226, a communication interface 228, and one or more ephemeral storage devices 232, which are coupled in communication via a bus 234 or other communication link.

The processing resource(s) of the storage server computing device 212 may execute a program of stored instructions for one or more aspects of the technology, as described and illustrated by way of the embodiments herein, although the processing resource(s) could execute other numbers and types of programmed instructions. The processing resource(s) in the storage server computing device 212 may include one or more central processing units (CPUs) or general purpose processors with one or more processing cores, application-specific integrated circuits (ASICs), field programmable gate arrays (FPGAs), and the like) and/or may be represented in the form of other types of electronic circuitry.

The memory 226 of the storage server computing device 212 may include any of various forms of read only memory (ROM), random access memory (RAM), flash memory, non-volatile or volatile memory, or the like, or a combination of such devices, for example. In this example, the memory 226 includes an operating system 236, a central service 237, and one or more virtual storage appliances 238*a-n*. As described further below, the central service 237 may be responsible for sharing the storage space within the ephemeral storage device(s) 232 for use as victim caches 248*a-n* by respective virtual storage appliances 238*a-n*.

In the context of the present example, each virtual storage appliance 238 is shown including respective ephemeral storage application programming interfaces (APIs) (e.g., APIs 246*a-b*), respective tables or tagstores 240*a-b*, respective buffer caches 242*a-b*, and respective insert queues 244*a-n*, although other types and/or numbers of applications or modules can also be included in other examples.

The operating system 236 can be a host operating system such as FreeBSD, Linux or the like, for example, that can act effectively as a hypervisor for the virtual storage appliances 238*a-n*, which is a kernel module in some examples. The virtual storage appliances 238*a-n* may be operable to functionally organize stored data by invoking storage operations to facilitate file services. In particular, the virtual storage appliances 238a-n may implement a file system to logically organize information as a hierarchical structure of directories and files on the data storage devices. Accordingly, the virtual storage appliances 238a-n may cooperate with the communication interface 228 to access information requested by clients (e.g., client devices 114a-n) and stored on the data storage devices, among other functions.

In one embodiment, the ephemeral storage device(s) 232 may include block-level flash memory that is local and accessible via the operating system 236. In some examples, the hardware of the storage server computing device 212, including the ephemeral storage devices 232 can be provided by a different entity than a provider of the virtual storage appliances 238a-n. In various embodiments described herein, the virtual storage appliances 238a-n may leverage the ephemeral storage devices 232 by utilizing the ephemeral storage API. In the context of the present example, the virtual storage appliances 238a-n may utilize the ephemeral storage devices 232 to host respective victim caches 248a-n, which store buffers that are evicted from respective buffer caches 242a-n of the virtual storage appliances 238a-n. Accordingly, the victim caches 248a-n effectively acts as an additional cache level, which facilitates improved performance of the virtual storage appliances 238a-n, as described and illustrated in more detail later. Depending upon the particular implementation, the ephemeral storage API may provide discover, read, and/or write functions/methods that expose the block-level ephemeral storage devices 232 to the virtual storage appliances 238a-n hosted by the storage server computing device 212 via the operating system 236 as described further below.

The tagstores 240a-n in this example may store information regarding file system blocks of data including whether the file system blocks are stored in the corresponding buffer cache 242a-n or in the corresponding victim cache 248a-n. As those skilled in the art will appreciate serving data from the buffer caches 242a-n or victim caches 248a-n is quicker than serving the data from one of the data storage devices and advantageously does not count against the disk IOPS limits and does not incur a cost in many cloud storage networks. Accordingly, the tagstores 240a-n include identifying information (e.g., a physical volume block number (PVBN)) and the location one or more corresponding file system blocks in the respective buffer cache 242a-n or one or more corresponding data and/or context blocks in the respective victim cache 248a-n, as described and illustrated in more detail later.

The buffer caches 242a-n in this example represent a repository for cached reads and writes associated with file system blocks of the data storage device(s) that are maintained in the form of buffers that can be used to service future reads to file system blocks more efficiently. Optionally, the buffer caches 242a-n may be stored in RAM memory that is faster than the medium (e.g., flash) of the ephemeral storage device(s) 232. In various examples described herein, it is assumed both the buffer caches 242a-n and the ephemeral storage device(s) 232 are faster than the data storage devices, which may represent network attached cloud storage resources (e.g., disks).

The optional insert queues 244a-n may be used by respective virtual storage appliances 238a-n to store buffers evicted from respective buffer caches 242a-n that have been identified as qualifying for insertion into respective victim caches 248a-n. The buffers evicted from a given buffer cache (e.g., buffer cache 242a) can be queued in the corresponding insert queue (e.g., insert queue 244a) and more efficiently stored, by the virtual storage appliance (e.g., virtual storage appliance 238a) using its ephemeral storage API, in the corresponding victim cache (e.g., victim cache 248a) as a batch, although evicted buffers can also be inserted directly into the victim cache in other examples.

The communication interface 228 of the storage server computing device 212 can include one or more network interface controllers (NICs) for operatively coupling and communicating between the storage server computing device 212 and clients, which may be coupled in communication via communication network(s) (e.g., communication network(s) 116 of FIG. 1), and the data storage devices, which may be coupled together by another network (e.g., SAN 122 of FIG. 1), although other types and numbers of communication networks or systems with other types and numbers of connections and configurations to other devices and elements also can be used.

Example Virtual Machine Architecture

Figure 3:
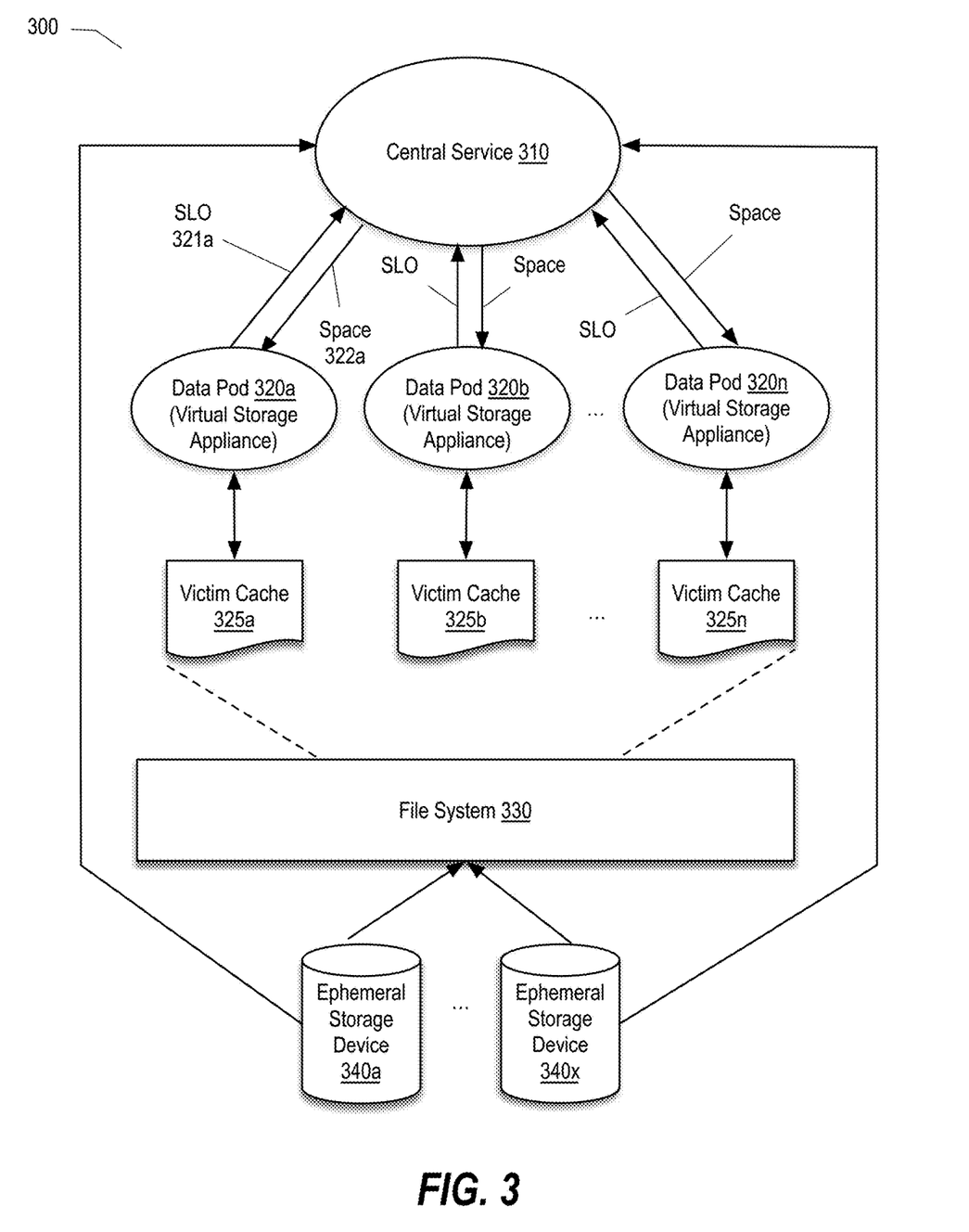
FIG. 3 is a block diagram conceptually illustrating an architecture of various functional units of a virtual machine in accordance with an embodiment of the present disclosure.

FIG. 3 is a block diagram conceptually illustrating an architecture 300 of various functional units of a virtual machine in accordance with an embodiment of the present disclosure. In the context of the present example, a central service 310 is used to manage and share ephemeral storage (e.g., ephemeral storage devices 340a-x) allocated to a virtual machine to facilitate use of the ephemeral storage by one or more virtual storage appliances (e.g., data pods 320a-n) as respective external victim caches 325a-n. Depending upon the particular implementation, the ephemeral storage devices 340a-x may be arranged as desired, such as RAID0 or individually.

The central service 310 may be responsible for managing the ephemeral storage devices 340a-x and the availability of the ephemeral storage devices 340a-x to the data pods 320a-n acting as the virtual storage appliances (e.g., virtual storage appliances 238a-n). For example, the central service 310 may allocate and reclaim ephemeral storage space for use by data pods 320a-n as victim caches 325a-n responsive to requests received by the data pods 320a-n and termination of the data pods 320a-n, respectively. The central service 310 may implement a heartbeat mechanism to determine whether any data pod to which is has allocated ephemeral space has gone down or otherwise been terminated. For example, each data pod may periodically send a heartbeat message to the central service 310 to notify the central service 310 that it is alive (e.g., remains active). In this manner, the central service 310 may reclaim ephemeral storage space allocated to a data pod that is no longer alive (e.g., as indicated by failure to receive a heartbeat message from a given data pod for a predetermined or configurable amount of time). Depending upon the particular implementation, the reclaimed ephemeral storage space may be retained for subsequent allocation to new data pods and/or may be redistributed among those data pods remaining active.

In one embodiment, the central service 310 may run in the same VM as the data pods 320a-n and be part of a daemon set. In one embodiment, when a VM/node comes up, the central service 310 may be the first pod that runs on it. Responsive to starting up, the central service 310 may discover the various ephemeral storage devices (e.g., ephemeral storage devices 140a-x) that are present and may format them with a file system 330 (e.g., a journaling file system, such as extended file system version 4 (ext4)). Thereafter, the central service 310 may maintain various metadata to facilitate management of the ephemeral storage.

For example, the central service 310 may maintain information regarding one or more of the following:
- the total amount of ephemeral drive space;
- the amount of space of the total that has been allocated to the data pods 320*a-n*;
- the remaining space available of the total;
- the total number of data pods that have been created and that remain active;
- a table that defines the SLOs and the percentage of ephemeral space that should be allotted to a particular data pod based on the SLO or a static mapping for each SLO (e.g., how much ephemeral space to allot).
- a table that maintains a list of current data pods (e.g., based on their respective pod identifiers) and how much ephemeral space has been allocated to each of the data pods 320*a-n* as well as a timestamp indicating when the central service received the last heartbeat message from each of the data pods 320*a-n*.

In the context of the present example and as described further below, upon startup of a given data pod (e.g., data pod 320*a*), the given data pod may initialize and configure its victim cache (e.g., victim cache 325*a*) by making a request to the central service 310 and providing its SLO (e.g., SLO 321*a*). In response, the central service 310 returns the amount of space (e.g., space 322*a*) the data pod may use for its victim cache. There are various approaches for determining appropriate allocations of total available ephemeral storage space among the data pods. For example, the central service 310 may perform a table lookup into a prepopulated table based on the SLO and the number of data pods to arrive at a percentage of the total available ephemeral storage space to be allocated to the given data pod. Alternatively, the central service 310 may dynamically calculate the amount of ephemeral storage space to be allocated to the given data pod based on a predefined or configurable ratio (e.g., 10-to-1, 20-to-1, or the like) of persistent disk storage associated with the given data pod to ephemeral storage space.

Example Victim Cache Initialization

Figure 4:
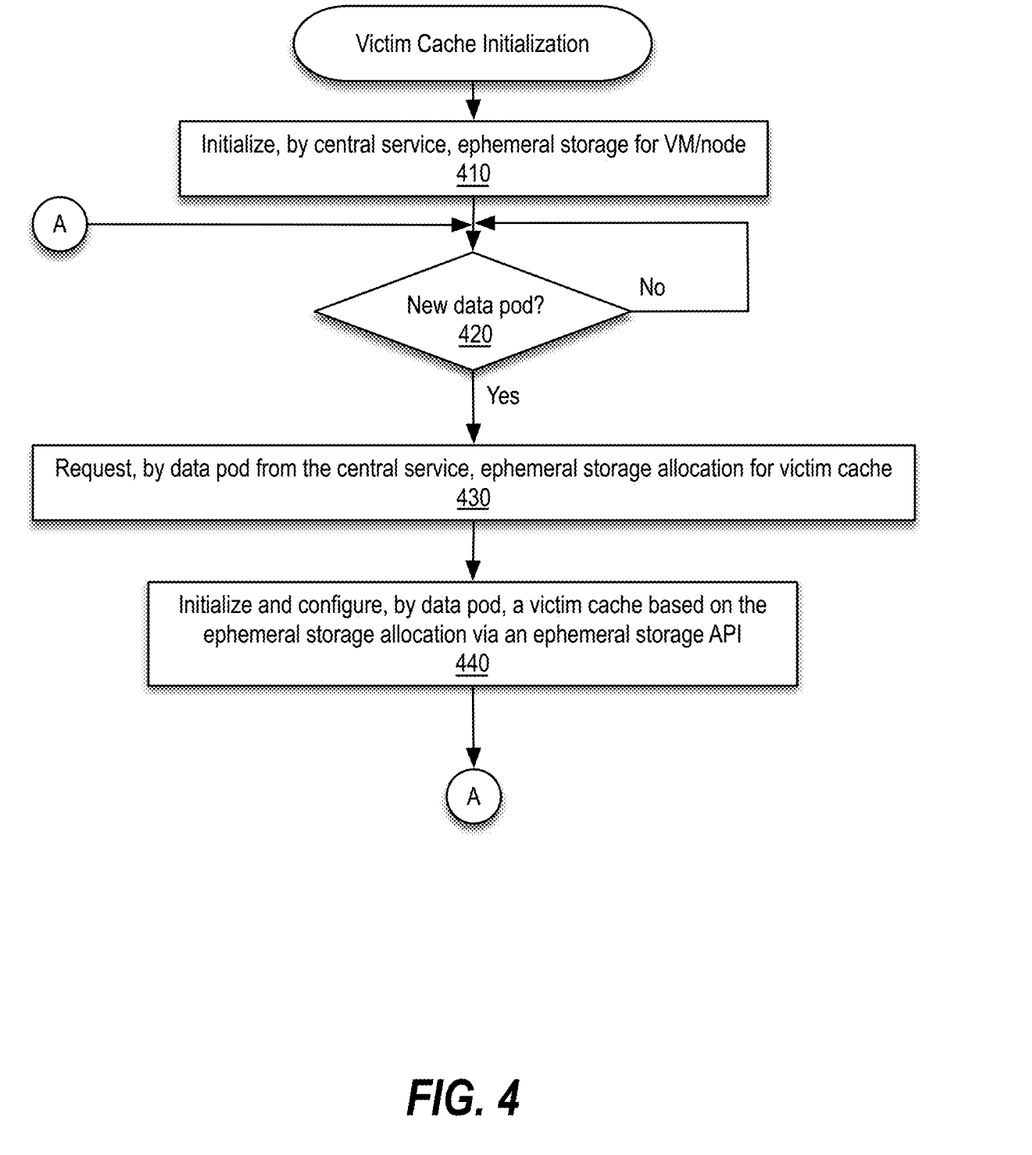
FIG. 4 is a flow diagram illustrating operations for performing victim cache initialization an environment in accordance with an embodiment of the present disclosure.

FIG. 4 is a flow diagram illustrating operations for performing victim cache initialization in an environment in accordance with an embodiment of the present disclosure. In the context of the present example, it is assumed a VM of potentially multiple VMs has been created on a storage server computing device (e.g., storage server computing device 212) and the VM is being configured to host one or more virtual storage appliances (e.g., virtual storage appliances 238*a-n*). The storage server computing device may include one or more local and non-persistent block-level ephemeral storage devices (e.g., ephemeral storage device(s) 232) that are accessible via an operating system (e.g., operating system 236) of the storage server computing device. As will be appreciated by those skilled in the art, such non-persistent storage media is not something that can be incorporated into an aggregate maintained by persistent data storage devices (e.g., data storage devices 118*a-n*). As such, in the event of a failure, the virtual storage appliance at issue may be rebooted on a different one of the storage server computing devices (e.g., storage server computing devices 112*a-n*). Since the ephemeral storage device(s) are local storage media, the virtual storage appliance would no longer have access to that data stored in the ephemeral storage device(s) in such a scenario.

As noted above, in one embodiment, when a VM/node comes up, the central service may be the first pod that runs on it. At block 410, a central service (e.g., central service 310) may initialize ephemeral storage (e.g., the portion of the total aggregate ephemeral storage space of ephemeral storage devices 340*a-x* that is available for use by the VM) for the VM or node at issue. In one embodiment, the central service (e.g., hosted by a VM of potentially multiple VMs running on the storage server computing device) initializes and configures utilization of one or more ephemeral storage devices by discovering the one or more ephemeral storage devices that are present and then formatting them with a file system (e.g., file system 330) appropriate for the operating system (e.g., operating system 236). At this point, one or more data pods (e.g., data pods 320*a-n*) representing the one or more virtual storage systems may come up. Accordingly, the ephemeral storage device(s) are ideally suited for use as an external cache in which corresponding data is persistently stored on the data storage devices. In this particular example, the file system created on the ephemeral storage device(s) is used to store one or more victim caches (e.g., victim cache 325*a*) for use by respective data pods (e.g., data pods 320*a-n*) acting as the virtual storage appliances.

At decision block 420, it is determined whether a new data pod (e.g., data pod 320*a*) has been created. If so, processing continues with block 430; otherwise, processing loops back to decision block 420.

At block 430, the new data pod requests its allocation of ephemeral storage for use as a victim cache (e.g., victim cache 325*a*) from the central service. In one embodiment, the request to the central service contains information regarding the SLO (e.g., SLO 321*a*) of the data pod and the central service returns an indication or success or failure and an amount of space (e.g., space 322*a*) the data pod may employ for the victim cache.

Assuming the request for ephemeral storage space is successful, at block 440, the data pod initializes and configures the victim cache based on the ephemeral storage allocation via an ephemeral storage API (e.g., one of APIs 246*a-n*). In one embodiment, the ephemeral storage API exposes the block-level ephemeral storage devices to the data pod via the operating system. In one embodiment, the ephemeral storage API provides a create function that can be invoked by the virtual storage appliance. The create function may be configured to use the operating system to create one or more files for use as the victim cache within the space allotted.

Example Usage of a Victim Cache

Figure 5:
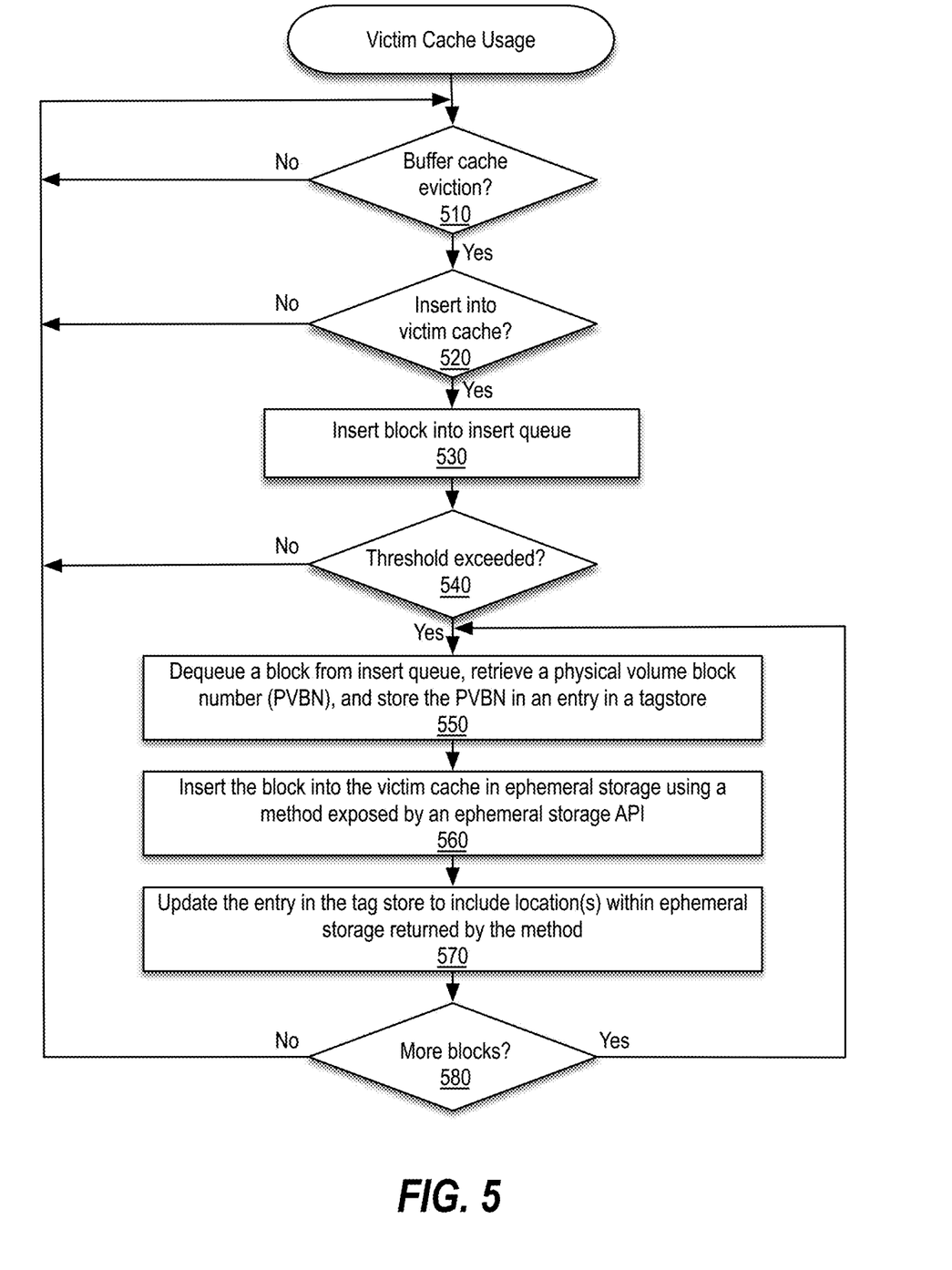
FIG. 5 is a flow diagram illustrating operations for usage of a victim cache in accordance with an embodiment of the present disclosure.

FIG. 5 is a flow diagram illustrating operations for usage of a victim cache in accordance with an embodiment of the present disclosure. In the context of the present example, it is assumed a victim cache has been created for use by a data pod (e.g., one of data pods 320*a-n*) acting as a virtual storage appliance (e.g., virtual storage appliance 238*a*) and the virtual storage appliance is now operational and servicing various read and write requests received from clients (e.g., client devices 114*a-n*) relating to data maintained by persistent data storage devices (e.g., data storage devices 118*a-n*). In one embodiment, read data can be maintained in a buffer cache (e.g., buffer cache 242*a*) to facilitate relatively quick responses for subsequent requests for the data. In this example, the buffer cache eventually reaches capacity and a buffer is evicted based on the application of a policy (e.g., an age-based policy).

At decision block 510, the virtual storage appliance determines whether a buffer has been evicted from the buffer cache. If so, processing continues with decision block 520;

otherwise processing loops back to decision block 510 and effectively waits for a buffer to be evicted from the buffer cache in this example.

At decision block 520, a determination is made by the virtual storage appliance regarding whether the file system block associated with the evicted buffer should be inserted into the victim cache. If so, processing continues with block 530; otherwise, processing branches to decision block 510 and subsequent requests for the file system block at issue will be directed to one of the data storage devices as the file system block will no longer be cached. This determination may be made based on the application of an established policy that prioritizes certain buffers over others for insertion in the victim cache. Accordingly, the policy can be based on hit count, type of data in the file system block, or likelihood of a future access by one of the clients, for example, although any other criteria can also be used to determine whether to insert an evicted buffer into the victim cache.

At block 530, the virtual storage appliance optionally inserts the file system block into an insert queue (e.g., insert queue 244a) in this example. The insert queue may be used to batch file system block insertions into the victim cache for efficiency purposes, although depending upon the particular implementation, file system blocks may also be inserted directly into the victim cache without being batched as well.

At decision block 540, it is determined by the virtual storage appliance whether a threshold capacity (e.g., a predetermined or configurable batch size of buffers) of the insert queue has been exceeded in the insert queue. If so, processing continues with block 550; otherwise, processing branches back to decision block 510.

At block 550, the virtual storage appliance dequeues a file system block from the insert queue, retrieves an identifier (e.g., a PVBN) (e.g., from metadata of the file system block), and stores the identifier in an entry in a tagstore (e.g., tagstore 240a). The entry can be identified based on the application of a hash algorithm, for example, although any other type of method for determining locations for insertions into the tagstore can also be used.

At block 560, the virtual storage appliance inserts the file system block into the victim cache using a method exposed by the ephemeral storage API. For example, the ephemeral storage API may include a write function that can be invoked by the virtual storage appliance. The write function may be configured to use the operating system to store the file system block in the victim cache and return the location(s) in the victim cache that were used to store the file system block. While outside the scope of the present disclosure, it is noted that the storage of file system blocks that include metadata (e.g., for error-checking purposes) may be striped across multiple sectors in which one represents a context block storing the metadata so as to avoid dedicating an entire block to context as described in US Pub. No. 2017/0344575, which is hereby incorporated by referenced in its entirety for all purposes.

At block 570, the virtual storage appliance 3 updates the entry in the tagstore that is associated with the file system block corresponding to the buffer evicted from the buffer cache to include the location(s) within the victim cache (e.g., as returned in block 560).

At decision block 580, the virtual storage appliance determines whether there are more evicted buffers or corresponding file system blocks in the insert queue. If so, processing continues with block 550; otherwise, processing branches back to decision block 510.

Example Read Request Processing

Figure 6:
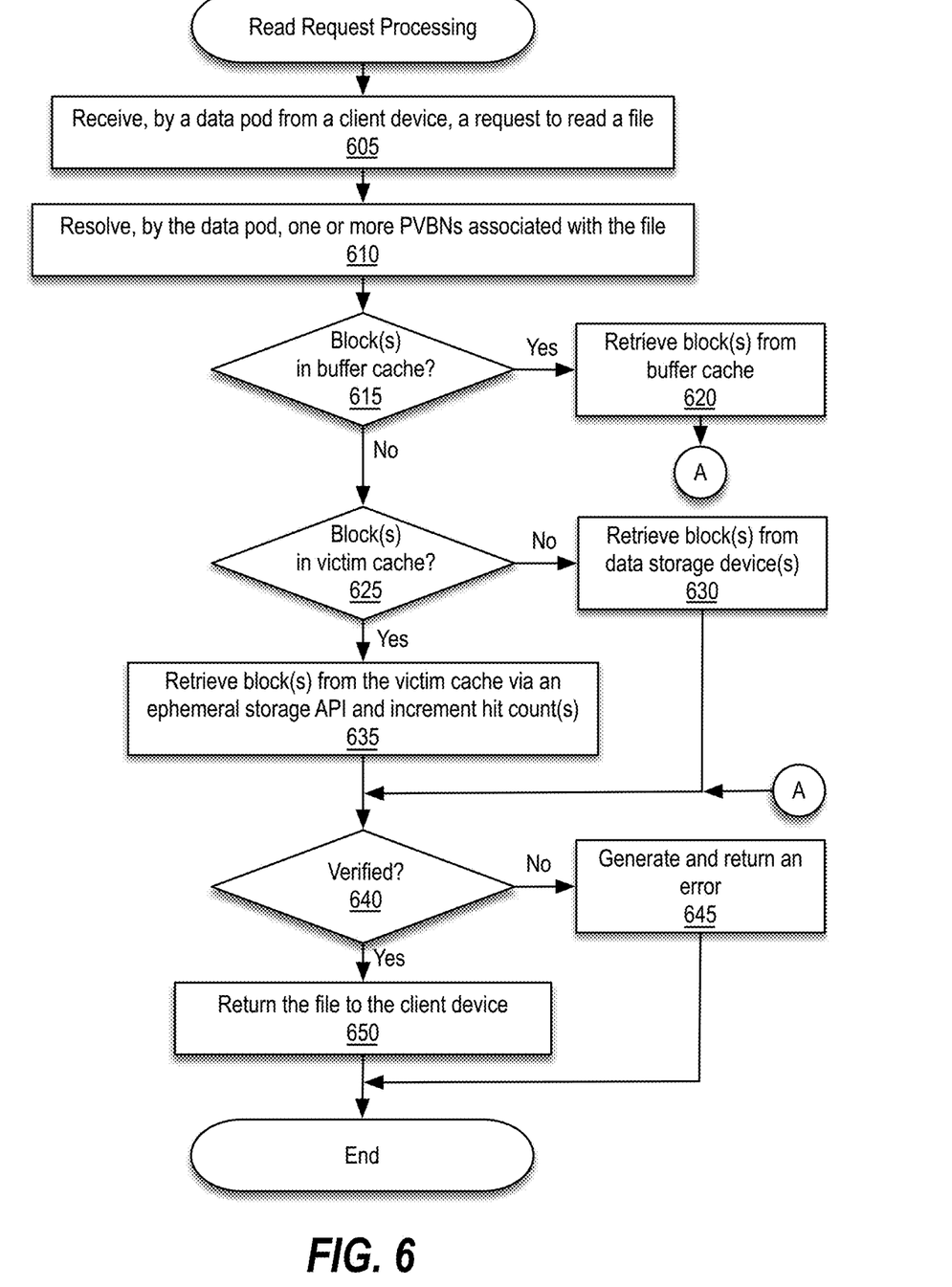
FIG. 6 is a flow diagram illustrating operations for performing read request processing in accordance with an embodiment of the present disclosure.

FIG. 6 is a flow diagram illustrating operations for performing read request processing in accordance with an embodiment of the present disclosure. As above, in the context of the present example, it is assumed a victim cache has been created for use by a data pod (e.g., one of data pods 320a-n) acting as a virtual storage appliance (e.g., virtual storage appliance 238a) and the virtual storage appliance is now operational and servicing various read and write requests received from clients (e.g., client devices 114a-n) relating to data maintained by persistent data storage devices (e.g., data storage devices 118a-n). In one embodiment, read data can be maintained in a buffer cache (e.g., buffer cache 242a) to facilitate relatively quick responses for subsequent requests for the data.

At block 605, the virtual storage appliance receives a request to read a file from a client. The read request can be received via communication network(s) (e.g., communication network(s) 116). At block 610, responsive to receipt of the read request, the virtual storage appliance resolves one or more identifiers (e.g., one or more PVBNs) of file system blocks associated with the file.

At decision block 615, the virtual storage appliance determines whether the file system blocks are in the buffer cache. If so, processing branches to block 620; otherwise, processing continues with decision block 625. The determination can be made based on an indication or location in the entries in the tagstore (e.g., tagstore 240a) for the file system blocks, for example, although other methods of determining whether the file system blocks are stored in the buffer cache can also be used.

At block 620, the virtual storage appliance retrieves the file system blocks from the buffer cache using the locations in the corresponding entries in the tagstore for the file system blocks. Since the file system blocks are retrieved from the buffer cache maintained in local memory (e.g., memory 226), no charge is incurred for the virtual storage appliance to obtain the file in this example. Similarly, such retrieval from local memory has no impact on disk IOPS limits. At this point in the present example, processing skips to decision block 640.

At decision block 625, the virtual storage appliance determines whether the file system blocks are in the victim cache. If so, processing branches to block 635; otherwise, processing continues with block 630. The determination can be made based on an indication or location in the entries in the tagstore for the file system blocks, for example, although other methods of determining whether the file system blocks are stored in the victim cache can also be used. Optionally, a hash function can be utilized to identify entries in the tagstore, for example. The tagstore can be populated as described above with reference to FIG. 5.

At block 630, the virtual storage appliance retrieves the file system blocks corresponding to the file from one or more of the data storage devices. Accordingly, when the requested file is not cached, the virtual storage appliance resolves the location of the file system blocks in the file system and uses a SAN (e.g., SAN 122) to obtain the file from one or more of the data storage devices. An associated charge is incurred for the transfer of the file across the SAN. Similarly, such access to the data storage devices counts against disk IOPS limits. At this point in the present example, processing skips to decision block 640.

At block 635, the virtual storage appliance retrieves the file system blocks from the victim cache using the locations included in the entries in the tagstore for the file system blocks and using the ephemeral storage API. Since, in this example, there was a hit in the tagstore for all of the file system blocks corresponding to the file, and the file system blocks were not stored in the buffer cache, the file system blocks are presumed to be stored in the victim cache. For example, the file system blocks were previously stored in the buffer cache and were subsequently evicted due to storage constraints of the buffer cache and as a result inserted into the victim cache, for example, as described above with reference to FIG. 5. As in the context of the present example, the victim cache is in local ephemeral storage, retrieval of the file will count against applicable ephemeral storage IOPS limits; however, no charge or disk IOPS are incurred for the virtual storage appliance to obtain the file in this example.

The virtual storage appliance in this example is configured to invoke a read method exposed by the ephemeral storage API, optionally passing one or more of the locations of the file system blocks retrieved from the tagstore. The read method may be configured to use the operating system to access the locations in the victim cache in order to obtain the file system blocks corresponding to the file. For each requested file system block, the read method may be configured to obtain multiple data blocks and one context block (e.g., containing metadata) that were inserted into the victim cache.

Optionally, the virtual storage appliance may also increment a hit count in the entries of the tagstore for each of the file system blocks to indicate that the file system blocks have been accessed by a client. The hit count can be used to evaluate an eviction policy for the victim cache, although age-based and other eviction policies can also be used to manage the victim cache.

At decision block 640, the virtual storage appliance determines whether the retrieved file system blocks are verified. With respect to file system blocks retrieved from the victim cache, a retrieved context block storing metadata can be used to verify that the data contained in corresponding data blocks, retrieved from the victim cache for each of the file system blocks, is valid, although other methods for verifying the retrieved file system blocks can also be used. If the virtual storage appliance determines the retrieved file system blocks are verified, then the file is returned to the requesting client at block 650 (e.g., via the communication network(s)); otherwise, processing branches to block 645.

At block 645, the virtual storage appliance generates and returns an error to the requesting client, drops the request received at block 605, and/or initiates a mitigation action to determine or correct the error, for example.

While in the context of the various flow diagrams described herein, a number of enumerated blocks are included, it is to be understood that examples may include additional blocks before, after, and/or in between the enumerated blocks. Similarly, in some examples, one or more of the enumerated blocks may be omitted and/or performed in a different order.

Embodiments of the present disclosure include various steps, which have been described above. The steps may be performed by hardware components or may be embodied in machine-executable instructions, which may be used to cause a processing resource (e.g., a general-purpose or special-purpose processor) programmed with the instructions to perform the steps. Alternatively, depending upon the particular implementation, various steps may be performed by a combination of hardware, software, firmware and/or by human operators.

Embodiments of the present disclosure may be provided as a computer program product, which may include a non-transitory machine-readable storage medium embodying thereon instructions, which may be used to program a computer (e.g., storage server computing device 212) or other electronic devices to perform a process. The machine-readable medium may include, but is not limited to, fixed (hard) drives, magnetic tape, floppy diskettes, optical disks, compact disc read-only memories (CD-ROMs), and magneto-optical disks, semiconductor memories, such as ROMs, PROMs, random access memories (RAMs), programmable read-only memories (PROMs), erasable PROMs (EPROMs), electrically erasable PROMs (EEPROMs), flash memory, magnetic or optical cards, or other type of media/machine-readable medium suitable for storing electronic instructions (e.g., computer programming code, such as software or firmware).

Various methods described herein may be practiced by combining one or more non-transitory machine-readable storage media containing the code according to embodiments of the present disclosure with appropriate special purpose or standard computer hardware to execute the code contained therein. An apparatus for practicing various embodiments of the present disclosure may involve one or more computers (e.g., physical and/or virtual servers) (or one or more processors within a single computer) and storage systems containing or having network access to computer program(s) coded in accordance with various methods described herein, and the method steps associated with embodiments of the present disclosure may be accomplished by modules, routines, subroutines, or subparts of a computer program product.

For example, a computer system (e.g., storage server computing device 212 of FIG. 2) may implement the techniques described herein using customized hard-wired logic, one or more ASICs or FPGAs, firmware or program logic which in combination with the computer system causes or programs the computer system to be a special-purpose machine. According to one embodiment, the techniques herein may be performed by storage server computing device 212 in response to one or more processing resource(s) (e.g., processors 224) executing one or more sequences of one or more instructions contained in main memory (e.g., memory 226). Such instructions may be read into main memory from another storage medium. Execution of the sequences of instructions contained in main memory may cause the one or more processing resource(s) to perform the process steps described herein. In alternative embodiments, hard-wired circuitry may be used in place of or in combination with software instructions.

The term "storage media" as used herein refers to any non-transitory media that store data or instructions that cause a machine to operation in a specific fashion. Such storage media may comprise non-volatile media or volatile media. Non-volatile media includes, for example, optical, magnetic or flash disks. Volatile media includes dynamic memory, such as main memory. Common forms of storage media include, for example, a flexible disk, a hard disk, a solid state drive, a magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media may participate in transferring information between storage media. For example, transmission media may include coaxial cables, copper wire and fiber optics, including the wires that comprise bus 234. Transmission media can also take the form of acoustic or light waves, such as those generated during radio-wave and infra-red data communications.

Various forms of media may be involved in carrying one or more sequences of one or more instructions to the one or more processing resource(s) for execution. For example, the instructions may initially be carried on a magnetic disk or solid state drive of a remote computer. The remote computer can load the instructions into its dynamic memory and send the instructions over a telephone line using a modem. A modem local to the computer system can receive the data on the telephone line and use an infra-red transmitter to convert the data to an infra-red signal. An infra-red detector can receive the data carried in the infra-red signal and appropriate circuitry can place the data on bus 234. Bus 234 may then carry the data to main memory, from which the one or more processing resource(s) may retrieve and execute the instructions.

Alternative Embodiments

A central service is described in various embodiments as performing ephemeral storage space management using files (e.g., providing a file system in which victim caches of respective virtual storage appliances may be stored); however, it is to be appreciated in alternative embodiments, such space management may be performed using blocks. For example, the central service may manage all the blocks of ephemeral storage and allocate them to the virtual storage appliances in chunks. As those skilled in the art will appreciate, this block-based approach has no need for installation of a file system on top of the raw ephemeral drives but would involve the central service maintaining additional data structures for garbage collection as well block management. While involving extra work to be performed by both the central service and the individual data pods and the additional communications between the central service and the individual data pods, this block-based approach may be a reasonable alternative depending upon the various tradeoffs associated with the particular implementation.

While in the context of the various embodiments described herein, a central service may be implemented on a per VM basis for managing ephemeral storage available to a particular VM and sharing it among multiple virtual storage appliances hosted by the particular VM, it is to be appreciated in alternative embodiments, the central service may be implemented on a per cluster basis for managing ephemeral storage on behalf a cluster of nodes (e.g., a group of storage server computing devices).

Comparative Example

Without limitation and solely for purposes of providing a concrete example of the benefits of a distributed ephemeral cache implemented in accordance with various embodiments described herein, first consider a cloud VM/compute-instance (e.g., a GCP standard N1-16 VM with an SSD persistent disk) that comes with a 25 K read/write disk IOPS limit and running a single 3 TB virtual storage appliance (e.g., a single data pod or container) having 3 TB of provisioned backing storage (e.g., persistent storage provided by data storage devices 118a-n) but with no local ephemeral storage. Assuming the service provider and consumer/end-user have agreed to an SLO of 4 K IOPS/TB on the frontend side (e.g., frontend end-user data read or write requests), support can be provided for 12 K IOPS on the frontend for this virtual storage appliance. Meanwhile, assuming a data amplification of 2 (e.g., due to indirects and metadata), the backend IOPS (e.g., from the perspective of the data storage devices 118a-n) would be 24 K. As this is close to the limit of 25 K, this system is not scalable. For instance, if it was desired to increase the size of the provisioned persistent storage to 4 TB, in this example, that would require 4 TB*4 K=16 K frontend IOPS and 32 K backend IOPS, which exceeds the disk IOPS limit of 25 K.

Now, consider the same scenario as above, but with local ephemeral storage present that is being intelligently shared by two 3 TB virtual storage appliances in accordance with the various embodiments described herein. In this example, each virtual storage appliance would need 12 K frontend IOPS and 24 K backend IOPS for a total requirement of 48 K backend IOPS. For purposes of this example, assume a local ephemeral drive is 375G in size and has an NVME interface that offers 170,000 read or 90,000 write IOPS. As noted above, the IOs done from the local ephemeral drive aren't counted against the IOs done from the VM. If up to 8 local drives can be added for a VM and the local drive IOs scale up to 4 ephemeral drives, the maximum IOs that can be achieved using the ephemeral drive in this example are 170,000*4 read IOPS=680,000 or 90,000*4=360,000 write IOPS. Since the ephemeral drives support much more than the needed 48 K backend IOPS, assuming most of the data is coming from the ephemeral drives, these two example virtual storage appliances can easily both scale to 4 TB and beyond by adding ephemeral storage that is shared between the two virtual storage appliances.

All examples and illustrative references are non-limiting and should not be used to limit the applicability of the proposed approach to specific implementations and examples described herein and their equivalents. For simplicity, reference numbers may be repeated between various examples. This repetition is for clarity only and does not dictate a relationship between the respective examples. Finally, in view of this disclosure, particular features described in relation to one aspect or example may be applied to other disclosed aspects or examples of the disclosure, even though not specifically shown in the drawings or described in the text.

The foregoing outlines features of several examples so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the examples introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A method comprising:
   discovering, by a central service, one or more local ephemeral storage devices associated with a virtual machine (VM) in a cloud environment; and
   facilitating, by the central service, sharing of storage space within the one or more local ephemeral storage devices among a plurality of virtual storage appliances that are created on the VM by, responsive to receipt of a request by a new virtual storage appliance of the plurality of virtual storage appliances:

allocating an amount of the shared storage space within the one or more local ephemeral storage devices for use by the new virtual storage appliance as a victim cache of the new virtual storage appliance; and returning, to the new virtual storage appliance, information regarding the allocated amount of the shared storage space within the one or more local ephemeral storage devices.

2. The method of claim 1, wherein the allocated amount of the shared storage space within the one or more local ephemeral storage devices is determined based on one or more of a total amount of ephemeral storage space represented by the one or more local ephemeral storage devices, a total number of the plurality of virtual storage appliances, a total amount of persistent storage associated with the new virtual storage appliance, and a service-level objective (SLO) of the new virtual storage appliance.

3. The method of claim 2, wherein the SLO is expressed in terms of a number of input/output operations per second (IOPS) per unit of the persistent storage.

4. The method of claim 1, wherein the shared storage space within the one or more local ephemeral storage devices is shared using a file-based approach and the method further comprises establishing, by the central service, a file system on the one or more local ephemeral storage devices.

5. The method of claim 1, wherein the shared storage space within the one or more local ephemeral storage devices is shared using a block-based approach and the method further comprises maintaining, by the central service, information regarding block ranges allocated to respective virtual storage appliances of the plurality of virtual storage appliances.

6. The method of claim 1, further comprising responsive to determining a virtual storage appliance of the plurality of virtual storage appliances has gone down or has otherwise been terminated, reclaiming, by the central service, an amount of the shared storage space within the one or more local ephemeral storage devices.

7. A non-transitory machine readable medium storing instructions, which when executed by a processing resource of a computer system, cause a central service running on the computer system to:

discover one or more local ephemeral storage devices associated with a virtual machine (VM) in a cloud environment; and facilitate sharing of storage space within the one or more local ephemeral storage devices among a plurality of virtual storage appliances that are created on the VM by, responsive to receipt of a request by a new virtual storage appliance of the plurality of virtual storage appliances:

allocating an amount of the shared storage space within the one or more local ephemeral storage devices for use by the new virtual storage appliance as a victim cache of the new virtual storage appliance; and returning, to the new virtual storage appliance, information regarding the allocated amount of the shared storage space within the one or more local ephemeral storage devices.

8. The non-transitory machine readable medium of claim 7, wherein the allocated amount of the shared storage space within the one or more local ephemeral storage devices is determined based on one or more of a total amount of ephemeral storage space represented by the one or more local ephemeral storage devices, a total number of the plurality of virtual storage appliances, a total amount of persistent storage associated with the new virtual storage appliance, and a service-level objective (SLO) of the new virtual storage appliance.

9. The non-transitory machine readable medium of claim 8, wherein the SLO represents a number of input/output operations per second (IOPS) per unit of the persistent storage.

10. The non-transitory machine readable medium of claim 7, wherein the shared storage space within the one or more local ephemeral storage devices is shared using a file-based approach and the instructions further cause the central service to establish a file system on the one or more local ephemeral storage devices.

11. The non-transitory machine readable medium of claim 7, wherein the shared storage space within the one or more local ephemeral storage devices is shared using a block-based approach and the instructions further cause the central service to maintain information regarding block ranges allocated to respective virtual storage appliances of the plurality of virtual storage appliances.

12. The non-transitory machine readable medium of claim 7, wherein the instructions further cause the central service to, responsive to determining a virtual storage appliance of the plurality of virtual storage appliances has gone down or has otherwise been terminated, reclaim an amount of the shared storage space within the one or more local ephemeral storage devices previously allocated to the virtual storage appliance.

13. The non-transitory machine readable medium of claim 7, wherein the computer system hosts the VM and the central service runs on the VM.

14. A system comprising:

a processing resource; and a non-transitory computer-readable medium, coupled to the processing resource, having stored therein instructions that when executed by the processing resource cause a central service running within the system to:

discover one or more local ephemeral storage devices associated with a virtual machine (VM) in a cloud environment; and facilitate sharing of storage space within the one or more local ephemeral storage devices among a plurality of virtual storage appliances that are created on the VM by, responsive to receipt of a request by a new virtual storage appliance of the plurality of virtual storage appliances:

allocating an amount of the shared storage space within the one or more local ephemeral storage devices for use by the new virtual storage appliance as a victim cache of the new virtual storage appliance; and returning, to the new virtual storage appliance, information regarding the allocated amount of the shared storage space within the one or more local ephemeral storage devices.

15. The system of claim 14, wherein the allocated amount of the shared storage space within the one or more local ephemeral storage devices is determined based on one or more of a total amount of ephemeral storage space represented by the one or more local ephemeral storage devices, a total number of the plurality of virtual storage appliances, a total amount of persistent storage associated with the new virtual storage appliance, and a service-level objective (SLO) of the new virtual storage appliance.

16. The system of claim 15, wherein the SLO represents a number of input/output operations per second (IOPS) per unit of the persistent storage.

17. The system of claim 14, wherein the shared storage space within the one or more local ephemeral storage devices is shared using a file-based approach and the instructions further cause the central service to establish a file system on the one or more local ephemeral storage devices.

18. The system of claim 14, wherein the shared storage space within the one or more local ephemeral storage devices is shared using a block-based approach and the instructions further cause the central service to maintain information regarding block ranges allocated to respective virtual storage appliances of the plurality of virtual storage appliances.

19. The system of claim 14, wherein the instructions further cause the central service to, responsive to determining a virtual storage appliance of the plurality of virtual storage appliances has gone down or has otherwise been terminated, reclaim an amount of the shared storage space within the one or more local ephemeral storage devices previously allocated to the virtual storage appliance.

20. The system of claim 14, wherein the system hosts the VM and the central service runs on the VM.

* * * * *